(12) United States Patent
Verma et al.

(10) Patent No.: US 7,561,071 B2
(45) Date of Patent: Jul. 14, 2009

(54) LANGUAGE INDEPENDENT REAL TIME COMMUNICATION DEVICE AND METHOD

(75) Inventors: Shubra Verma, Karnataka (IN); Saptharishi Ramkumar, Karnataka (IN)

(73) Assignee: General Electric, LD., Schenectady, NY (US)

( * ) Notice: Subject to any disclaimer, the term of this patent is extended or adjusted under 35 U.S.C. 154(b) by 477 days.

(21) Appl. No.: 11/550,694

(22) Filed: Oct. 18, 2006

(65) Prior Publication Data

US 2008/0106440 A1    May 8, 2008

(51) Int. Cl.
    *H03M 11/00* (2006.01)
(52) U.S. Cl. .............. 341/22; 704/9; 455/566; 455/575.1; 341/173
(58) Field of Classification Search .......... 341/173, 341/176, 20, 22; 455/575.1, 550.1, 566; 704/9
See application file for complete search history.

(56) References Cited

U.S. PATENT DOCUMENTS

| | | | | |
|---|---|---|---|---|
| 4,853,888 | A * | 8/1989 | Lata et al. ............... | 345/172 |
| 6,577,843 | B2 * | 6/2003 | Akita et al. ............... | 399/396 |
| 6,882,859 | B1 | 4/2005 | Rao et al. | |
| 2002/0045463 | A1 | 4/2002 | Chen et al. | |
| 2004/0260536 | A1 | 12/2004 | Hwang | |
| 2005/0208983 | A1 | 9/2005 | Khoo | |
| 2006/0064519 | A1 * | 3/2006 | Patterson ............... | 710/36 |
| 2006/0067496 | A1 | 3/2006 | McDade et al. | |

* cited by examiner

*Primary Examiner*—Albert K Wong (57) ABSTRACT

This invention discloses a language independent real time communication device and method in healthcare domain. In an embodiment a mobile phone with a language independent keypad capable of acting as real time communication device in health care domain is disclosed. The mobile phone is provided with an indicator on the keys in the keypad of the mobile phone, the indicator is configured for altering indicium for the selected plurality of keys and/or indicators from a form suitable for use in one language to a form suitable for use in another language and/or to select icons, images or pictures indicating nature of a predetermined item of data represented or a predefined function a key. A processor is provided for programming at least one key in the keypad for performing a predefined function or to represent a predetermined item of data, wherein visually perceptible indicium for each of the selected keys is an indication of an item of data or function performed by the keys. Also the invention discloses a user input device, which can configure the existing mobile communication device, to act as an efficient language independent real time communication device in healthcare domain.

8 Claims, 7 Drawing Sheets

LANGUAGE INDEPENDENT REAL TIME COMMUNICATION DEVICE AND METHOD

FIELD OF THE INVENTION

This invention generally relates a language independent real time communication device and method in healthcare domain. More particularly, it relates to a mobile communication device with a language independent keypad capable of acting as real time communication device in healthcare domain.

BACKGROUND OF THE INVENTION

In the growing healthcare domain, it is desirable to have devices that will allow a user to communicate effectively with a doctor or a hospital environment irrespective of language and region. The healthcare facilities in rural areas need to be developed for improving the health status of people in developing or developed countries. Improvement in the healthcare domain can be achieved by making the medical facilities available to rural areas as well. However there are certain limitations in the widespread use of the medical facilities in rural areas. One of the significant limitations is illiteracy or the non-knowledge of a common language like English.

In healthcare domain, the patient needs to communicate effectively with the doctor or any other caretaker, who might be located at different parts of a country or region. Normally different people from different region speak different languages. As the people in the rural areas or people residing in different parts of the country may not be able to understand the language of communication of the doctor, establishing effective communication between the caller and the doctor, nurse or any other care taker will be difficult. Further in case of emergency the doctor should be conveyed correctly about the severity or urgency of the situation. Most of the time communication is not carried out effectively mainly due to different languages of interaction.

Mobile communication devices have solved the problem of communication to a certain extend and some of the mobile communication devices have the flexibility of adapting to different languages. However normally the mobile phones/ communication devices will have soft keypads for language selection. But the visual indicium of the keypad will not change even after the mobile phone is configured to work for a selected language. Adapting to a different language from an in-built language will require special knowledge about the functionality of the mobile phone. So an illiterate person may not be able to efficiently use the existing cell phones.

Thus there exist a need to develop an effective language independent real time communication method and device in healthcare domain. The communication method should be implemented taking care of the illiterate rural population.

SUMMARY OF THE INVENTION

The above-mentioned shortcomings, disadvantages and problems are addressed herein which will be understood by reading and understanding the following specification.

In an embodiment the invention provides a configurable user input device with changeable indicia, attachable to a mobile communication device is provided. The user input device comprising: a keypad with a plurality of keys and indicators, each the said keys capable of being programmed to represent a predetermined item of data or perform a predefined function, the data being entered or function being carried out by actuating the keys of the user input device; a processor coupled to the keypad for programming the plurality of keys and indicators; an indicia associated with at least a selected plurality of said keys for providing a visually perceptible indicium for each of the selected keys indicative of the item of data or function represented by the keys and/or a visually perceptible indicium for the nature of each of the indicators; and a connector for connecting the user input device to the mobile communication device; wherein the indicia interacts with the processor for altering indicium for the selected plurality of keys and/or indicators from a form suitable for use in one language to a form suitable for use in another language and/or to select icons, images or pictures indicating nature of a predetermined item of data represented or a predefined function a key. In an embodiment indicia is e-ink film.

In an embodiment the invention provides a mobile phone with a language independent keypad capable of acting as real time communication device. The mobile phone comprising: a keypad having a plurality of keys and indicators, each of the plurality of keys of the keypad is configured for representing a visually perceptible indicium for each of the selected keys indicative of an item of data or function represented by the keys; a processor coupled to the keypad for programming at least one key for performing a predefined function or to represent a predetermined item of data, wherein visually perceptible indicium for each of the selected keys is an indication of an item of data or function performed by the keys; indicia associated with at least a selected plurality of said keys and/or indicators for providing a visually perceptible indicium for each of the selected keys indicative of the item of data or function represented by the keys and a visually perceptible indicium for the nature of each of the indicators; a transceiver for transmitting and receiving a communication data; and an audio and visual display for displaying the communication data; wherein the indicia interacts with the processor for altering indicium for the selected plurality of keys and/or indicators from a form suitable for use in one language to a form suitable for use in another language and/or images or pictures indicating nature of a predetermined item of data represented or a predefined function a key.

In another embodiment, a method of communicating using a mobile communication device having a language independent keypad, in healthcare domain is disclosed. The method comprising the step of: configuring at least a selected plurality of keys in the keypad of for representing a visually perceptible indicium for each of the selected keys indicative of an item of data or function represented by the keys; programming at least one key for performing a predefined function or to represent a predetermined item of data, wherein visually perceptible indicium for each of the selected keys is an indication of an item of data or function performed by the keys; conveying the predefined function or predetermined item of data to a hospital by actuating the keys representing corresponding indicium, the keys being manually actuated by a caller; allocating a job based on the actuated key to at least one recipient through a server located at the hospital, wherein the allocation of the job being conveyed visually and aurally to the recipient in a first set of pre-selected languages; replying the recipient to the caller, wherein reply being conveyed to the caller visually and aurally in a second set of pre-selected languages.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

In an embodiment, a configurable user input device with changeable indicia, attachable to a mobile communication device is disclosed. The user input device can configure an existing mobile communication device to communicate effectively in a healthcare domain irrespective of the language, pole or region.

In various embodiments of the invention a mobile communication device with language independent keypad is disclosed. In an embodiment a mobile phone is configured to act as a language independent real time communication device in health care domain. As a person skilled in the art may notice, even though the concept is explained in healthcare domain, it may be extended to several other domains where a there exist a need for real time communication with language independency. Thus the embodiments, are not so limited, and may be implemented in connection with other domains such as industrial environment, banking domain, any service industry, marketing domain or of any communication system where there is an integral keyboard for carrying out a desired function of the system. Also the invention need not be limited to mobile phones, but rather it may be applied to various mobile communication devices such as Personal Digital Assistant (PDA), for example Blackberry PDA.

In another embodiments a method of communicating in a healthcare domain using a mobile communication device with a language independent keypad is disclosed. As mentioned earlier the communication may be established in different domains and need not be restricted to healthcare.

Figure 1:
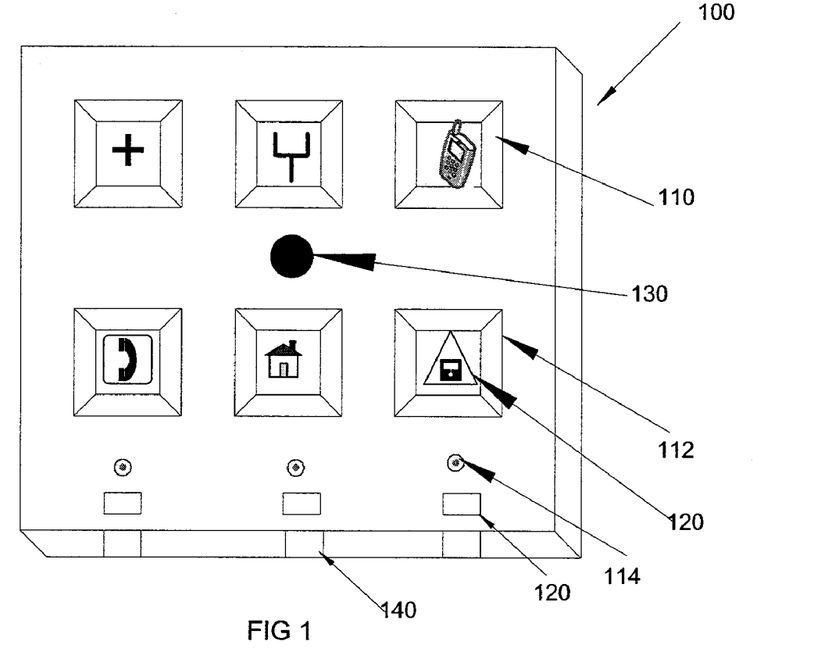
FIG. 1 is a schematic diagram of a configurable user input device with changeable indicia, attachable to a mobile communication device as described in an embodiment of the invention.

FIG. 1 is a schematic diagram of a configurable user input device with changeable indicia, attachable to a mobile communication device as described in an embodiment of the invention. The configurable user input device with changeable indicia, attachable to a mobile communication device is shown as 100. The concept is explained in a healthcare domain. One skilled in the art will however appreciate that, concept may not be limited to this. The mobile communication device may be mobile phones, PDA, laptops etc.

In an embodiment, the user input device 100 is provided with a keypad 110 having plurality of keys 112 and indicators 114 representing an indicium of the function being carried out or data being represented. Each key 112 of the keypad 110 is capable of being programmed to perform a specific function or to represent a predetermined data. The function may be preformed by manually actuating the keys 112 of the user input device 100. A processor 130 is provided for programming selected keys to perform a specific function or to represent a predetermined data. In an embodiment plurality of each of selected keys are provided with an indicia 120. The indicia 120 provide the selected plurality of said keys and/or indicators a visually perceptible indicium indicative of the item of data or function represented by the keys and a visually perceptible indicium for the nature of each of the indicators. The indicia 120 is configured for establishing a visually perceptible indicium in a form for use in a given language or in the form of icons, images and pictures. The indicia 120 is electrically operable and maintains said indicium in visibly perceptible form even when the electrical power is off.

In an embodiment the indicia 120 is configured for altering indicium for the selected plurality of keys and/or indicators. The indicia 120 can alter the visual indicium of the selected keys from a form suitable for use in one language to a form suitable for use in another language, making it language independent. In another embodiment the indicia 120 are configured for altering indicium of selected keys by selecting icons, images or pictures indicating nature of a predetermined item of data represented or a predefined function of a key. The indicia 120 provide indicium comprising an alpha-numeric character or characters or comprise other character or characters or icons, pictures or images. The indicia 120 is applied to the selected keys of said user input device, individually or as a whole. In an embodiment indicia 120 is applied as a membrane and is provided proximate to the indicators or keys.

For example if the user input device is used by a person who knows only Chinese language, then he may configure the keypad of the user input device 100 in Chinese language by altering the indicium of the keys. If the person is illiterate the user input device 100 may be configured by using standard icons, pictures or images, which will visually indicate the function or data represented by the keys so that by actuating the keys representing the standard symbols or images, the user may communicate effectively without the knowledge of any language. If an illiterate person needs to call up hospital, the user input device 100 can have a key with a "+" symbol. The user may actuate that key for calling the hospital without the knowledge of any language or any other functional or operational complexities of the mobile communication device or the user input device.

In an embodiment the indicia 120 comprises electronic-ink film. The electronic ink film is placed on the selected keys. The electronic ink film covers a plurality of said keys fully or partially. The electronic ink film is placed in proximity to said keys or indicators.

The processor 130 is coupled to the keypad 110 for programming a plurality of selected keys to perform a specific function or to represent a predetermined data. The processor further comprises a memory for storing alpha-numeric characters or characters corresponding to a predefined set of languages and icons, images or pictures indicating nature of a predetermined item of data represented or a predefined function a key.

In an embodiment, the processor 130 is configured for synchronizing the operation of the user input device 100 with the mobile communication device. This may be achieved by installing a computer program or software in the user input device as well as in the mobile communication device. The software should be capable to detect the user input device attached to the mobile communication device and operational commands, which the mobile communication device receives from the user input device 100. Or it should detect the mobile communication device attached to the user input device and the operational commands, which the user input device receives from the mobile communication device.

In an embodiment the user input device 100 is provided with a connector 140 for connecting the user input device to the mobile communication device. The connector may include wireless, wired or USB connectors.

In an embodiment the keys are provided in the form of switches mounted on a substrate of a printed circuit board. In an embodiment the indicia 120 may be Liquid Crystal Displays (LCD).

In an embodiment, the keyboard may also have indicators 114 for indicating the user input device 100 status, such as "PowerOn", "Standby", etc. or of communication status of the user input status such as "Call diverting", "Call waiting" "Responding" etc. In another embodiment the user input device 100 can have different programmable/configurable "severity indices" configured to indicate or represent the severity of the situations/patient. The indicators 114 may be provided with indicia 120 to configure the visual indicium of the labels affixed near to the indicators to display the nature of the indicators. Alternately the indicators 114 may be configured to display or send different colors to indicate the severity. The severity may be conveyed visually or aurally. The visual communication can be carried out by showing different colors for different severity and the aural indication can be conveyed by increasing ringing tone volume or increasing vibrating alert of the mobile communication device. Also the severity may be conveyed with the help of actuating a predefined key, which may be programmed to send an alert signal upon activation. In an example a key may be visually represented as "Alarm Key" using indicia 120 and actuating the key may convey the severity of the situation. The mobile communication device may be configured to have a default severity, if no severity was selected. For example if the caller calls the "cardiologist" the severity may be set as "high" and if the caller calls the "family doctor" the severity, may be set as "low" by default. The user is given the flexibility to set the severity based on need.

Figure 2:
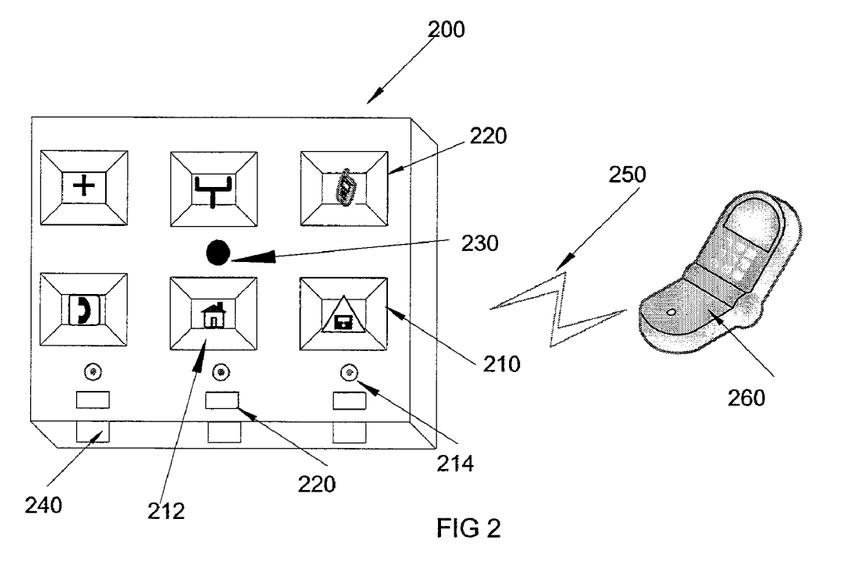
FIG. 2 is a schematic diagram of a configurable user input device with changeable indicia, attached to a mobile phone as described in an embodiment of the invention.

FIG. 2 is a schematic diagram of a configurable user input device with changeable indicia, attached to a mobile phone as described in an embodiment of the invention. In an embodiment the user input device 200 is connected to a mobile phone for configuring the mobile phone to act as a language independent communication device. However it may be noted that the user input device is capable of configuring any mobile communication device such as PDAs to act as a language independent communication device. In an example the user input device 200 is attached to a mobile phone 260. The user input device 200 is provided with a keypad 210 having a plurality of keys 212 and indicators 214 representing an indicium of the function being carried out or data being represented. The plurality of each of selected keys is provided with an indicia 220 for providing a visually perceptible indicium indicative of the item of data or function represented by the keys and a visually perceptible indicium for the nature of each of the indicators. In an embodiment the indicia 220 is configured for altering indicium for the selected plurality of keys and/or indicators. A processor 230 coupled to the keypad 210 is provided for programming selected keys to perform a specific function or to represent a predetermined data. The user input device 200 is provided with a connector 240 for connecting the user input device 200 to the mobile communication device. The connector may include wireless, wired or USB connectors. The construction and functional aspect of user input device 200 is same as that described with reference to FIG. 1.

In an embodiment the mobile phone 260 is linked to the user input device 200 through a communication link 250. The communication link 250 may be a wireless or wired communication link. In an example, the wireless link is an internet and the wired link may a wired connector such as USB cable, wires etc. The connector 240 of the user input device 200 is connected to the mobile phone 260 via the communication link 250.

Figure 3:
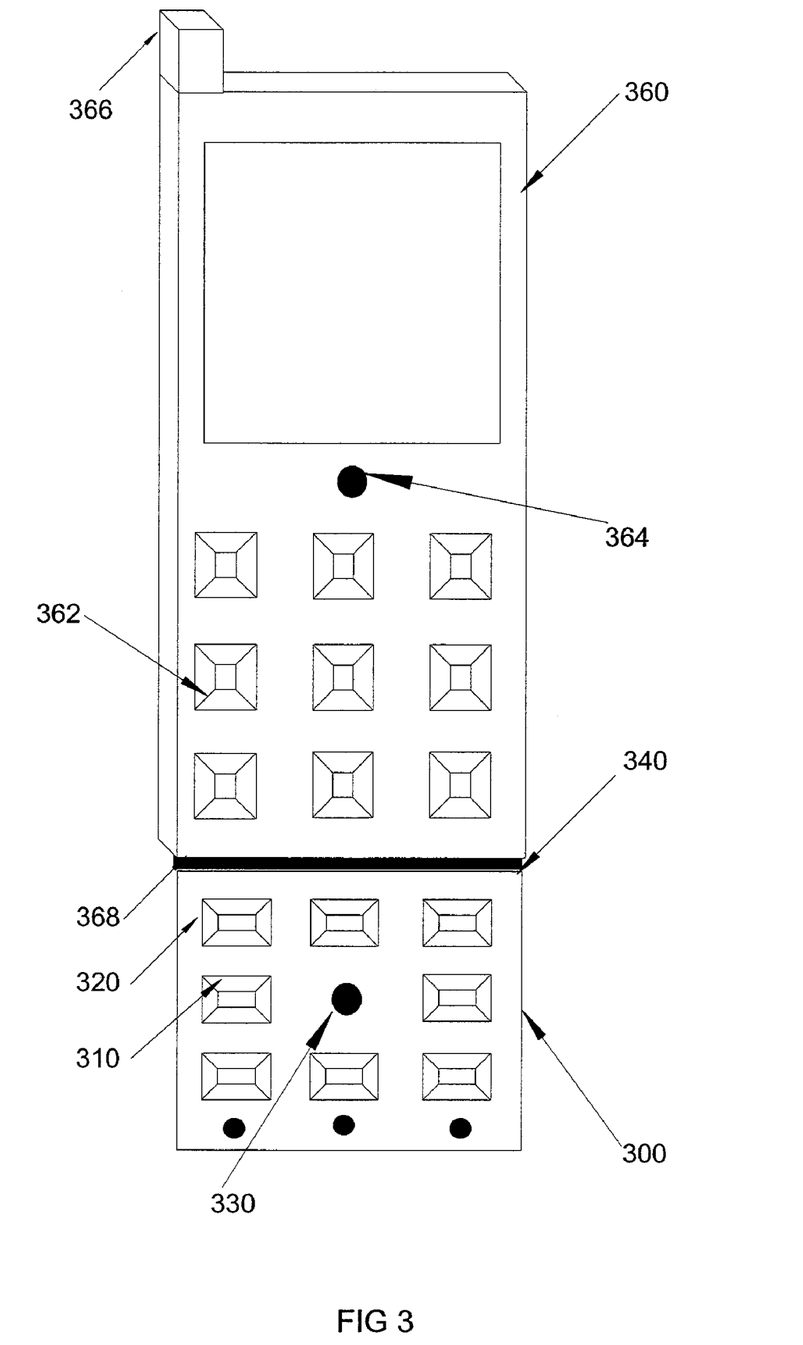
FIG. 3 is a schematic diagram of a configurable user input device with changeable indicia, attached to a mobile phone as described in another embodiment of the invention.

FIG. 3 is a schematic diagram of a configurable user input device with changeable indicia, attached to a mobile phone as described in another embodiment of the invention. The configurable user input device 300 is attached to a mobile phone 360 for configuring the existing mobile phone to act as a language independent real time communication device. The user input device 300 is provided with a keypad 310 having a plurality of keys and indicators. A plurality of each of selected keys is provided with an indicia 320 for providing a visually perceptible indicium indicative of the item of data or function represented by the keys and a visually perceptible indicium for the nature of each of the indicators. A processor 330 coupled to the keypad 310 is provided for programming selected keys to perform a specific function or to represent a predetermined data. The processor is further configured for synchronizing the operation of the user input device 300 with the mobile phone 360. The user input device 300 is provided with a connector 340 for connecting the user input device to the mobile communication device. The connector may include wireless, wired or USB connectors. The features, functionalities and constructional aspect of the user input device is same as that described in FIG. 1

In an embodiment the mobile phone 360 is provided with keypad 362 for operating the mobile phone. The keypad 362 is a standard keypad with a plurality of keys. A processor 364 coupled to the keypad 362 is provided for performing various functions of the mobile phone 360 based on the instructions received through the keypad 362. The processor 364 is further configured for synchronizing the operation of the mobile phone 360 with user input device 300. The mobile phone 360 is provided with a transceiver for transmitting and receiving signals. The mobile phone 360 has a plurality of connectors 368 for connecting the mobile phone 360 to the user input device 300. The connector 368 may include wireless, wired or USB connectors.

In an embodiment, the user may select the visual indium of the selected keys using the indicia 320. Each key is configured for performing a predefined function and the function is performed by manually actuating the keys. Whenever the keys of the user input device 300 is actuated the processor 330 of the user input device 300 will send an initialization signal to the mobile phone 360. The processor 364 of the mobile phone 360 will identify the initialization signal and synchronize the operation of the mobile phone 360 with the user input device 300. The function of the key to be performed or the date stored is conveyed to a recipient using the transceiver 366 of the mobile phone 360.

In an embodiment a connector 368 is provided in the mobile phone 360 for connecting the mobile phone with the user input device 300. The connector includes a wired connector such as in the form a plug, socket or PSTN connection etc and wireless connectors such as USB ports, Bluetooth, internet etc.

Figure 4:
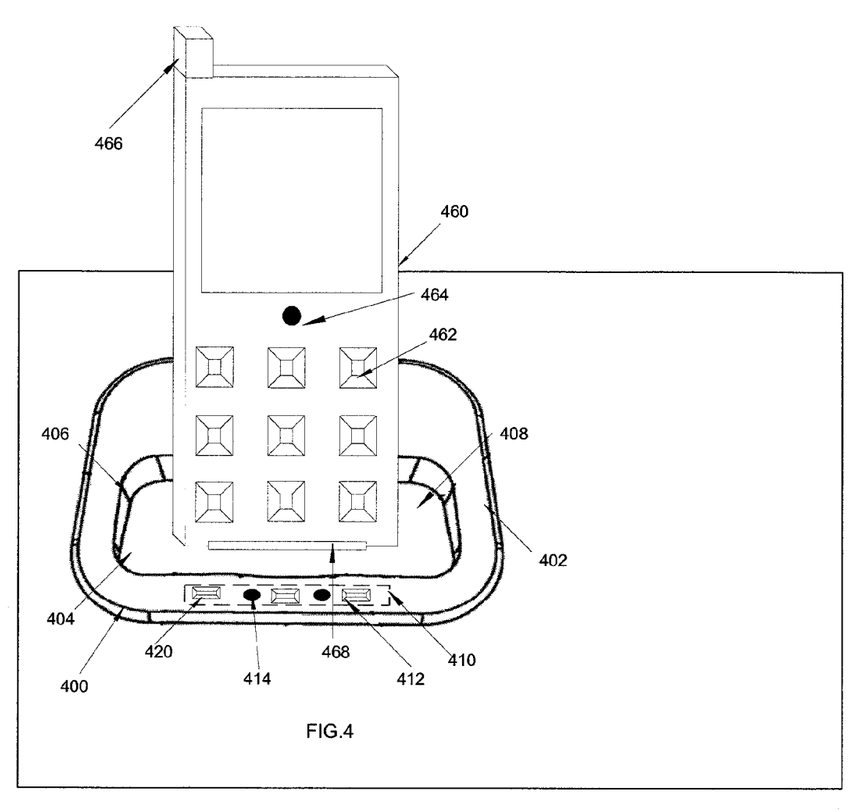
FIG. 4 is a schematic diagram of a configurable user input device with changeable indicia, attached to a mobile phone as described in another embodiment of the invention.

FIG. 4 is a schematic diagram of a configurable user input device with changeable indicia, attached to a mobile phone as described in another embodiment of the invention. The user input device is connected to a mobile phone for configuring the mobile phone to act as a language independent communication device. In an embodiment the user input device is in the form of a cradle 400. The cradle 400 is provided with a main body 402 and a cavity 404 inside the main body. The cavity 404 is configured for accommodating a mobile phone 460. In an embodiment the main body 402 of the cradle 100 is shaped like a trough having a cavity 404 at the center. The cavity 404 is bordered with sidewalls 406 and a bottom wall 408 located within the main body 402. The bottom wall 408 may be provided with a slit (not shown) for accommodating a cable for providing electrical connection, if required for the cradle. In an embodiment the main body may be provided with a keypad 410. The keypad 410 having plurality of keys 412 and indicators 414 representing an indicium of the function being carried out or data being represented. Each key 412 of the keypad 410 is capable of being programmed to perform a specific function or to represent a predetermined data. In an embodiment an indicia 420 is provided for the selected plurality of said keys and/or indicators a visually perceptible indicium indicative of the item of data or function represented by the keys and a visually perceptible indicium for the nature of each of the indicators. The visual indicium of the keys and indicators may be altered using the indicia 420.

Figure 5:
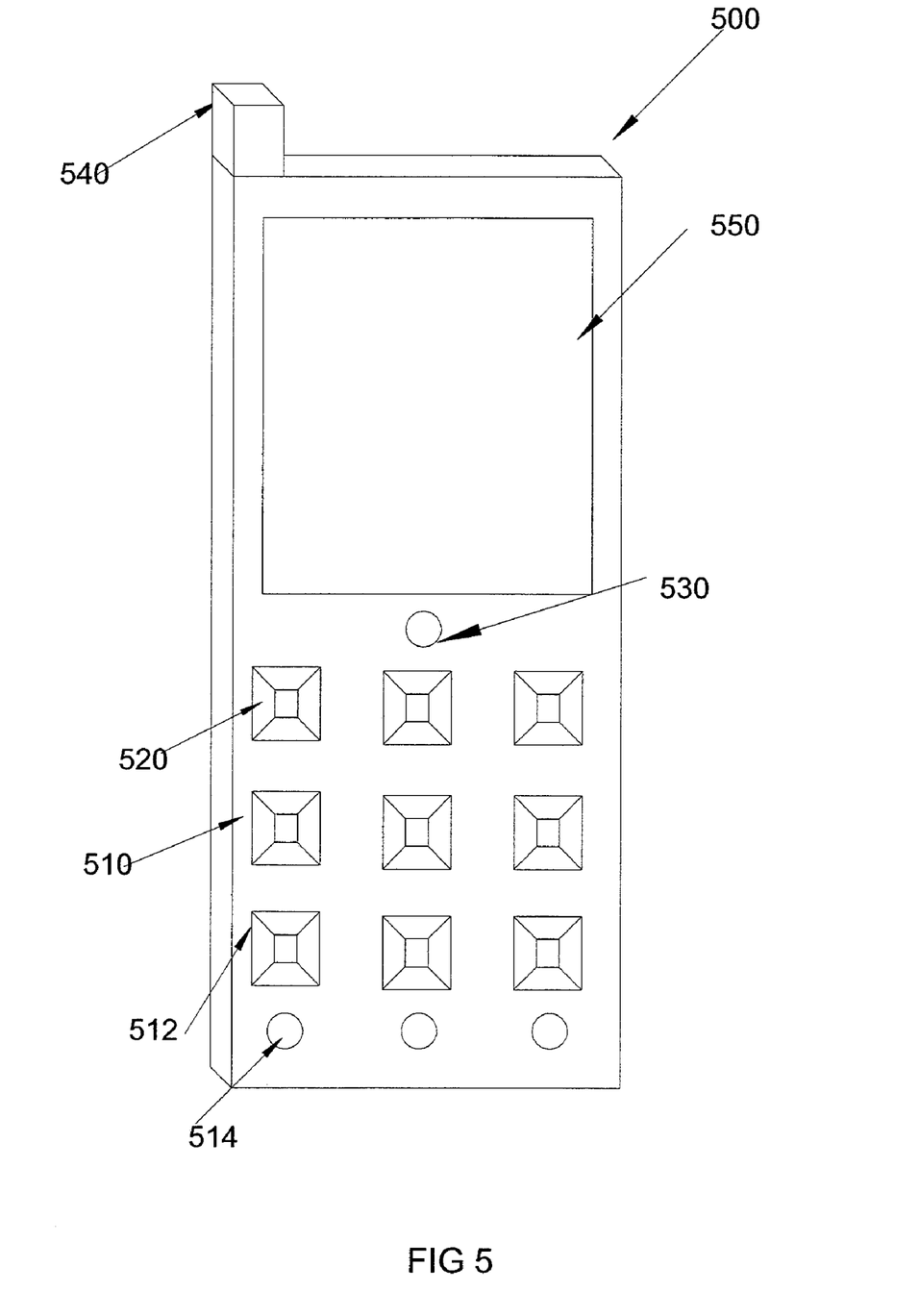
FIG. 5 is a schematic diagram of a mobile phone with a language independent keypad as disclosed in an embodiment of the invention.

FIG. 5 is a schematic diagram of a mobile phone with a language independent keypad as disclosed in an embodiment of the invention. The mobile phone 500 is provided with a standard keypad 510. The keypad 510 has a plurality of keys 512 each of the plurality of keys of the keypad 510 is configured for representing a visually perceptible indicium indicative of an item of data or function represented by the keys 512. Further each of the said keys 512 is capable of being programmed to represent a predetermined item of data or perform a predefined function. The data is entered or function being carried out by actuating the keys 512 of the mobile phone 500. The mobile phone 500 is provided with a processor 530. The processor 530 is coupled to the keypad 510 for programming at least one key for performing a predefined function or to represent a predetermined item of data. A selected plurality of said keys is provided with an indicia 520 for providing a visually perceptible indicium for each of the selected keys indicative of the item of data or function represented by the keys and/or a visually perceptible indicium for the nature of each of the indicators.

In an embodiment the indicia 520 is configured for altering indicium of the selected plurality of keys and/or indicators.

The indicia 520 can alter the visual indicium of the selected keys from a form suitable for use in one language to a form suitable for use in another language, making it language independent. In another embodiment the indicia 520 are configured for altering indicium of selected keys by selecting images or pictures indicating nature of a predetermined item of data represented or a predefined function of a key. The indicia 520 provide indicium comprising an alpha-numeric character or characters or comprise other character or characters. The indicia 520 is applied to the keys of the mobile phone, individually or as a whole. In an embodiment indicia 520 is applied as a membrane and is provided proximate to the indicators or keys. In an embodiment the indicia 520 is an electronic-ink film. The electronic ink film is placed on the selected keys. The electronic ink film covers a plurality of said keys fully or partially. The electronic ink film is placed in proximity to said keys or indicators.

In an embodiment, the keyboard 510 may also have indicators 514 of indicating the mobile phone status, such as "PowerOn", "Standby" etc. or of communication status such as "Call diverting", "Call waiting" "Responding" etc. In another embodiment the mobile phone 500 can have different programmable/configurable "severity indices" configured to indicate or represent the severity of the situations/patient. The indicators 514 may be provided with indicia 520 to configure the visual indicium of the labels affixed near to the indicators 514 to display the nature of the indicators. Alternately the indicators 514 may be configured to display or send different colors to indicate the severity. The severity may be conveyed visually or aurally. The visual communication may be carried out by showing different colors for different severity and the aural indication can be conveyed by increasing ringing tone volume or increasing vibrating alert of the mobile phone 500. Also the severity may be conveyed with the help of actuating a predefined key, which may be programmed to send an alert signal upon activation. In an example the key may be visually represented as "Alarm Key" using the indicia 520. The mobile phone 500 may be configured to have a default severity, if no severity was selected. For example if the caller calls the "cardiologist" the severity may be set as "high" and if the caller calls the "family doctor" the severity, may be set as "low" by default. The user is given the flexibility to set the severity based on need.

In an embodiment the mobile phone 500 is provided with a transceiver 540 for transmitting and receiving a communication data for establishing the communication. The transceiver 540 may be an antenna provided with the mobile phone 500. An audio and visual display 550 is provided for displaying the communication data.

In an embodiment the mobile phone 500 is configured to communicate language independently in a healthcare environment. The pluralities of the keys on the keypad 510 may be configured to display different images, icons or pictures. The visual indicium of these keys is an indicative of an item of data represented or function performed by the keys. The function of the keys may be carried out by actuating the keys. In an example a key may be represented with a "phone symbol". This may be achieved by selecting the indicium of the selected key as a "phone symbol" using the indicia 520. The indicium may be selected from a memory (not shown) associated with the processor 530. The memory stores alpha-numeric characters or characters corresponding to a predefined set of languages and images or pictures indicating nature of a predetermined item of data represented or a predefined function a key. Using the processor 530, the key may be programmed to call a caretaker in case of emergency. So in case of an emergency the patient or the caller may be able to inform the caretaker by actuating the key, which visually provides an indication to call the caretaker. Alternately the key may be programmed to send a predefined text of messages to the caretaker upon actuation. The predefined text may be converted into different languages in which the recipient intent to get the message. Also the message may be communicated aurally in a predefined set of languages selected by the recipient. Similarly the recipient, may reply to the caller by actuating a key programmed to send a message to the caller. For example the recipient may send a predefined message "Will attend in five minutes" by actuating the key programmed for the same. Using the indicia 520 the user may configure the visual indicium of the key to visually represent the function performed by the key. Also the message may be conveyed to the caller visually or aurally in a pre-selected set of languages selected by the caller.

One skilled in the art should appreciate that any mobile communication device may be configured as a language independent communication device as described in the above manner. For example a PDA may be configured as a language independent mobile communication device as using the technique described above.

Figure 6A:
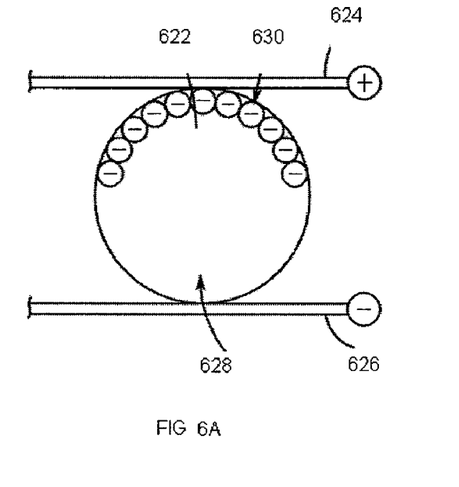
FIGS. 6A and 6B diagrammatically show the principles of electronic ink technology that may be used in the invention.
Figure 6B:
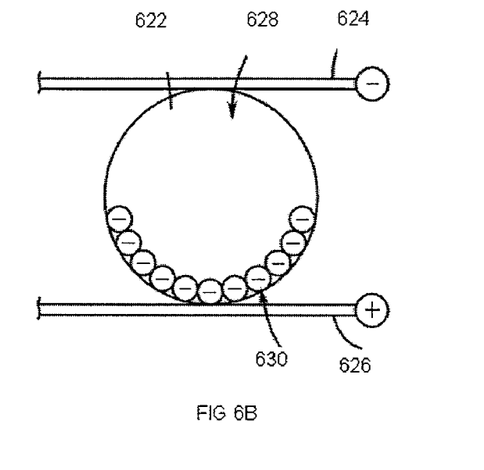

FIGS. 6A and 6B diagrammatically shows the principles of electronic ink technology that may be used in the device of the present invention. For operation of keypad, it is necessary to provide an indicium for each of the keys indicating to the operator the data or function attributable to each of the keys or the nature of the indicators. A flexible electronic ink film is applied over the keys to provide indicium for each of the keys. An electronic ink film would similarly be applied adjacent to indicators. Electronic ink film may be covered by a flexible protection layer (not shown), if desired, to lend durability and a longer service life to keyboard.

The electronics ink film may utilize thin film transistor (TFT) technology in which plastic transistors are printed on to a thin film of plastic for use in controlling a layer of pigmented microcapsules that are changed from a first color to a second color and back by using small electrical charges controlled by the plastic transistors. A form of electronic ink is shown in FIGS. 3A and 3B that diagrammatically depicts electronic ink microcapsule 622 sandwiched between two layers of thin film transistors 624 and 626 that are charged with a positive or negative polarity, respectively. Microcapsule 622 is filled with a blue or similarly colored ink 628, within which white, electronically charged, balls, chips, or similar elements 630 are suspended.

In the example shown in FIGS. 6A and 6B, negatively charged balls 630 react to the charges of thin film transistors 624 and 626. As depicted in FIG. 6A, thin film transistor layer 624 has a positive charge that attracts the white balls 630 to the top of microcapsule 622, thus making it appear white when viewed from the top. Conversely, in FIG. 3B, thin film transistor layer 626 has a positive charge and the white balls 630 are attracted towards thin film transistor 626, thus exposing the blue ink 628. This makes the microcapsule 622 appear blue when viewed from the top. By employing a plurality of the microcapsules 622 in the layer, as operated by the thin film transistor layers, indicium for the keys and indicators may be formed from the microcapsules contained in film. Thin film transistor layers 624 and 626 can be operated by conductors in a printed circuit board.

Advantages of electronic ink technology include a superior look featuring high contrast, a wide viewing angle, and legibility in low light. Indicium formed from electronic ink consume no power except when the indicium are being changed and allowing the indicium to remain in a visually perceptible form when the power is turned off. Additional information about electronic ink technology usable with embodiments of the present invention is provided in U.S. Pat. Appl. Ser. No. 11/398248, entitled "Apparatus Having User Input Device with Changeable Indicia", filed on Apr. 5, 2006, the contents of which are incorporated herein by reference in their entirety.

Figure 7:
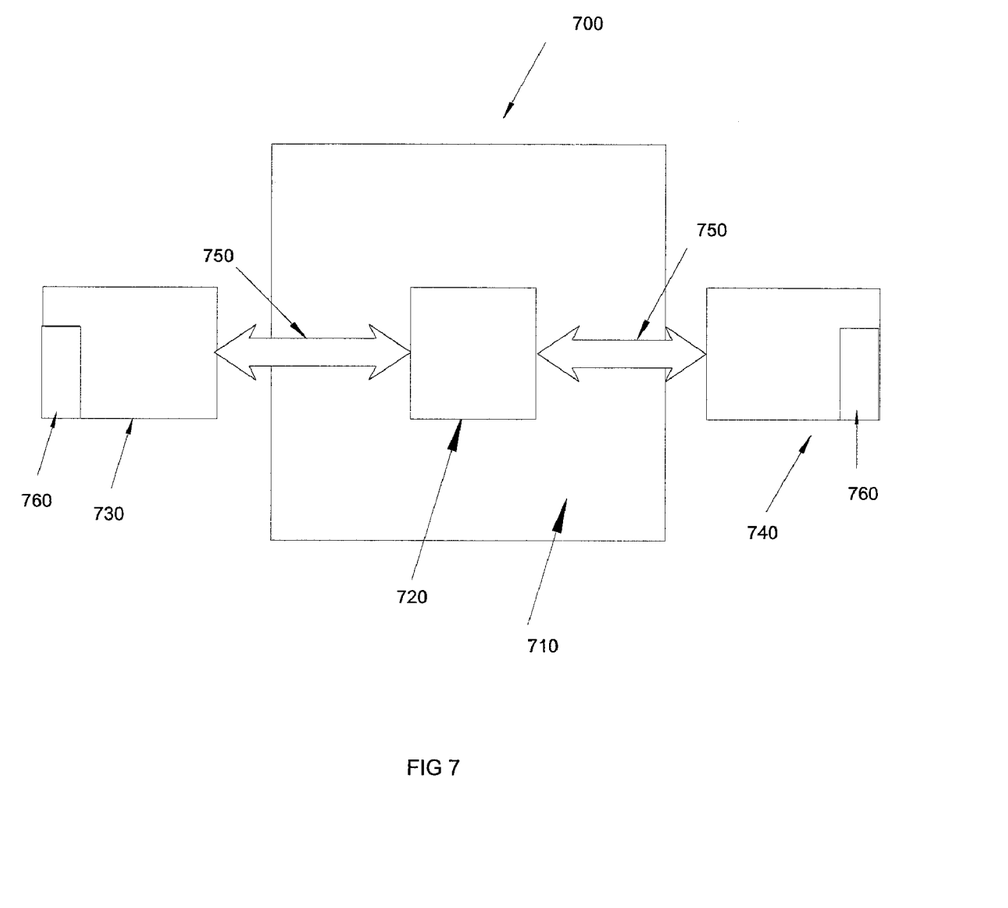
FIG. 7 is a schematic diagram of medical imaging system communicating via a mobile communication device with a language independent keypad using a method as described in an embodiment of the invention.

FIG. 7 is a schematic diagram of medical system communicating via a mobile communication device with a language independent keypad using a method as described in an embodiment of the invention. The communication system 700 comprises a hospital environment 710, which may include the facilities of the hospital, staffs of the hospital, a server 720 for synchronizing the function of the hospital. The server 720 provided at the hospital acts as an interaction interface between a caller 730, which may be a patient and a recipient 740, which may be a doctor, nurse, caretaker or any other attendar. The server 720 may be any network server with a database containing the records of the hospital staff and the patients. The patient details include the monitoring information of the patient such as name, address, contact numbers etc along with past medical records. The patient is given an option to select the language or languages which he prefer to interact with the hospital staff. The hospital staff includes the doctors, nurses, or any other attenders who might be relevant to the treatment of the patient. The hospital staff information includes the details of the staff, their expertise, work schedule etc and their preferred language of communication. However the patient data and the hospital staff information may not be limited to the abovementioned examples.

In an embodiment the patient/caller 730 is provided with a mobile communication device 760, in which the keys are programmed to act as an effective language independent real time communication tool. The mobile communication device may be a mobile phone, PDAs, laptops etc. The mobile communication device 760 has a keypad having a plurality of keys. The visual indicium of selected keys may be configured to represent a visual indicium of the data being represented or the function being performed by the keys. An indicia may be used for providing a visually perceptible indicium for each of the selected keys indicative of the item of data or function represented by the keys and/or a visually perceptible indicium for the nature of each of the indicators. The plurality of keys in the keypad is being programmed to perform a predefined function or to represent a predefined item of data. For example a key may be provided with an image of an "Ambulance". Activating this key will directly interact with the ambulance service. In an embodiment the patient/caller 730 facing an emergency situation like a road accident or heart attack, due to the severity of the situation the patient may not be able to dial the desired number or may not effectively communicate aurally. In this event the patient can call the doctor/recipient 740 by actuating a key which is programmed to call the doctor/recipient 740 upon actuation. Else the key may be programmed to send a text message to the doctor/recipient 740. The key may have a visual indicium like "+" so that even an illiterate person can use this feature. The call may be routed via the server 720, wherein the server 720 will be able to identify the available doctor/recipient 740 and the language on which the doctor/recipient 740 would prefer to have communication. Accordingly the server 720 will direct the call to the doctor/recipient 740 in a first set of pre selected language, the first set of pre selected language being selected by the doctor/recipient 740. In an embodiment the call is conveyed to the doctor or any recipient in text and voice format, wherein the language of the text and voice is in the first set of pre-selected language. The doctor/recipient 740 may also have a mobile communication device 760 with a language independent keypad, in which the selected keys are programmed to perform a pre-defined function. As explained earlier the recipient may program a key to send a message to the patient by actuating a key which is programmed to perform the same function. The recipient may select a second set of pre-selected language in which the recipient will receive message from the caller aurally and in text format.

The patient/caller 730 is allowed to convey a predefined function or a predefined data by actuating a key which has a visual indicium of the function to be performed or data being represented. In an example a key may be configured to send an SMS to the hospital. When the key is actuated by the patient/caller 730, a predefined message in text or voice format is sent to the server 720. Once the key is actuated the message is sent to the server 720. The server 720 will identify the mobile number of the patient/caller 730 from the message. The server 720 will retrieve the patient data. According to the past medical history, availability of the relevant hospital staff and the emergency of the situation the call will be allocated to a recipient. As mentioned earlier the call is conveyed to the recipient in text or voice format is a second set of pre-selected language.

Once the doctor/recipient 740 receives the call, the doctor/recipient 740 replies to the patient/caller 730. For example the doctor may reply to the patient/caller 730 saying that "Take the Medicine XXX". This message will be conveyed to the patient/caller 730 in a second set of pre-selected language. The message is conveyed as text message as well as voice message.

A communication channel 750 is used for communicating using the mobile phone 760. In an embodiment the severity of the situation is conveyed by different rings tones of different modulation frequency. In an alternative the severity may be conveyed by different forms of vibrations or by increasing the ringing volume of the mobile phone 760.

In another embodiment the device can have different programmable/configurable "severity indices" configured to indicate or represent the severity of the situations/patient. The indicators may be provided with an indicia to configure the visual indicium of the labels affixed near to the indicators to display the nature of the indicators. Alternately the indicators may be configured to display or send different colors to indicate the severity. The severity may be conveyed visually or aurally.

Figure 8:
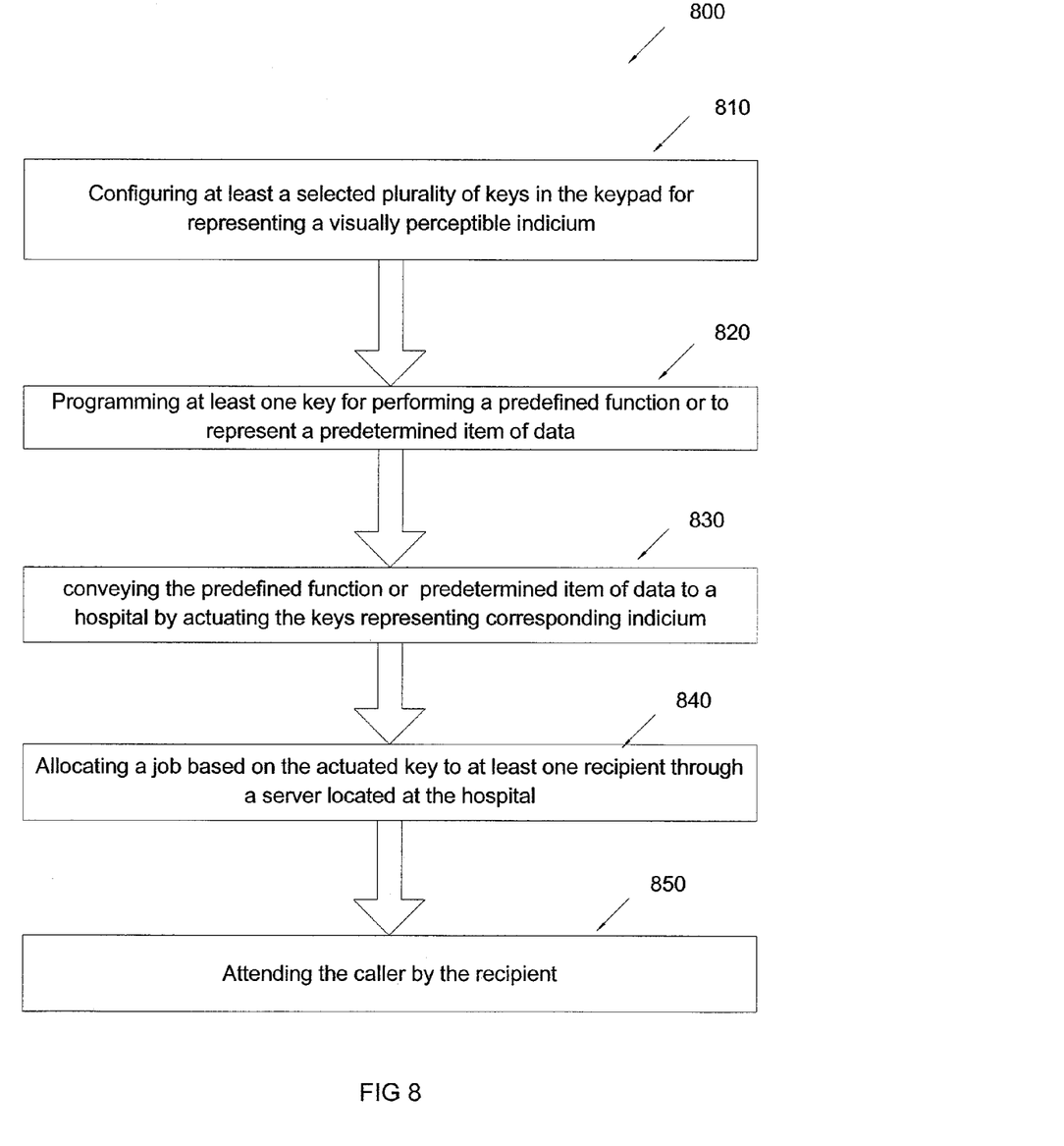
FIG. 8 is a flow chart indicating a method of communicating in a healthcare domain using a mobile communication device with a language independent keypad as described in an embodiment of the invention.

FIG. 8 is a flow chart indicating a method of communicating in a healthcare domain using a mobile communication device with a language independent keypad as described in an embodiment of the invention. In an embodiment the invention provides a method 800 of communicating language independently in a healthcare domain. At step 810, at least a selected plurality of keys in the keypad is configured for representing a visually perceptible indicium for each of the selected keys indicative of an item of data or function represented by the keys. An indicia is used for altering indicium for the selected plurality of keys and/or indicators from a form suitable for use in one language to a form suitable for use in another language and/or to select images or pictures indicating nature of a predetermined item of data represented or a predefined function of a key. At step the 820, at least one key is programmed for performing a predefined function or to represent a predetermined item of data. A processor is provided for programming the keys. At step 830, the predefined function or predetermined item of data is conveyed to a hospital by actuating the keys representing corresponding indicium. The visual indicium of the keys may be in the language known to the user or may be represented by standard icons, images or pictures. Thus if a key is programmed to call up the hospital by actuating that key the user may call up the doctor directly. The key visually represents the "+" symbol to call the doctor. Similarly different keys, which are pre-programmed to perform different functions or to represent predetermined data may be actuated for carrying different functions. In an example a key may be stored with some data, the actuating the key will send a short message to the hospital/doctor saying that the patient is having a "Chest pain". In emergency the user need not have to call up the doctor or to send an SMS, instead he may actuate the key programmed for sending an SMS to the doctor. At step 840, a job is allocated based on the actuated key to at least one recipient through a server located at the hospital. The server is fed with the patient information and the hospital staff information. The job is conveyed to the recipient aurally as well as in the form of text message. The recipient is given an opportunity to select a first set of pre-selected languages, on which the message needs to be conveyed. At step 550, the recipient responds to the caller. The caller may select a second set of pre-selected languages, on which the reply may be conveyed. The reply may be conveyed as a voice message or as a text message.

The above-description of the embodiments of the device 100, mobile phone 500, the method 800 have the technical effect of communicating language independently in a healthcare domain. The language independency will allow the flexibility of connecting the rural population to a hospital in the urban area without actually knowing the language prevalent in the urban area.

In an embodiment a detachable and configurable user input with changeable indicia to a mobile communicating device is provided. A selected plurality of the keys may be programmed to perform a specific function, performed by easily recognizable display of those services in the form of icons or images. In an embodiment the area information or the GPRS to the request to the respective service is noted to identify the location of the caller and this will act as a crucial information in case of road accidents or any other emergencies. The message from the caller is recorded and conveyed to the recipient and the chances of loosing the information is low. In addition a voice recognition system is provided in association with the server for recognizing the voice of the patient. In an embodiment the device, or the mobile phone is protected with a password. The password can be selected in any language or by using different images or icons.

The various applications of the invention include effective handling of emergency situations like road accidents. It acts as a two way real time communication of "Health alarm" to a family physician or nursing staff by a rural community. The invention will allow telemedicine and will provide tremendous opportunity for medical tourism.

Thus various embodiments of language independent communication system and methods are provided in a healthcare environment. However the invention is not limited to this or any particular application or environment. Rather, the technique may be employed in a range of applications, including any communication system where there is an integral keyboard for carrying out a desired function of the system.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

We claim:

1. A configurable user input device with changeable indicia, attachable to a mobile communication device, having independent inputs, to enable the mobile communication device to receive input from the input device and to communicate with the mobile device independent of language, comprising:

a keypad with a plurality of keys having changeable indicators, each of the key indicators programmable to represent a predefined item of data or to represent a predefined function wherein the data being entered or function being carried out is initiated by actuating the keys of the user input device;

a processor coupled to the keypad for programming the plurality of keys and indicators;

a plurality of indicia for association with the plurality of keys for presenting a visually perceptible indicium for each of the selected keys to indicate the item of data or function associated with each key; and a connector for connecting the user input device to the mobile communication device such that the data or function selected is input to the mobile device without using the inputs of the mobile device;

wherein the processor selects from the plurality of indicator and alters indicum for each of the plurality of keys from a form suitable for use in one language to a form suitable for use in another language.

2. The user input device as in claim 1, wherein the processor is configured for storing alpha-numeric characters or characters corresponding to a predefined set of languages and icons, images or pictures indicating nature of a predetermined item of data represented or a predefined function a key.

3. The user input device as in claim 1, wherein the processor is configured for synchronizing operation of the user input device with the mobile communication device.

4. The user input device of claim 1, wherein said indicator comprise an electronic-ink film placed on selected keys individually or as a whole.

5. The user input device of claim 1, wherein indicator is configured for establishing a visually perceptible indicium in a form for use in a given language or in the form of icons, images and pictures.

6. The user input device of claim 5, wherein the indicator is further configured for selecting images or pictures for establishing a visually perceptible indicium for selected keys in a form of icons, images and pictures.

7. The user input device of claim 1, wherein the keys include a liquid crystal displays.

8. The user input device of claim 1, wherein the connector includes a wired connector or a wireless connector.

* * * * *